No. 691,534. Patented Jan. 21, 1902.
J. H. DAILEY.
BLANKET.
(Application filed Aug. 9, 1901.)
(No Model.)
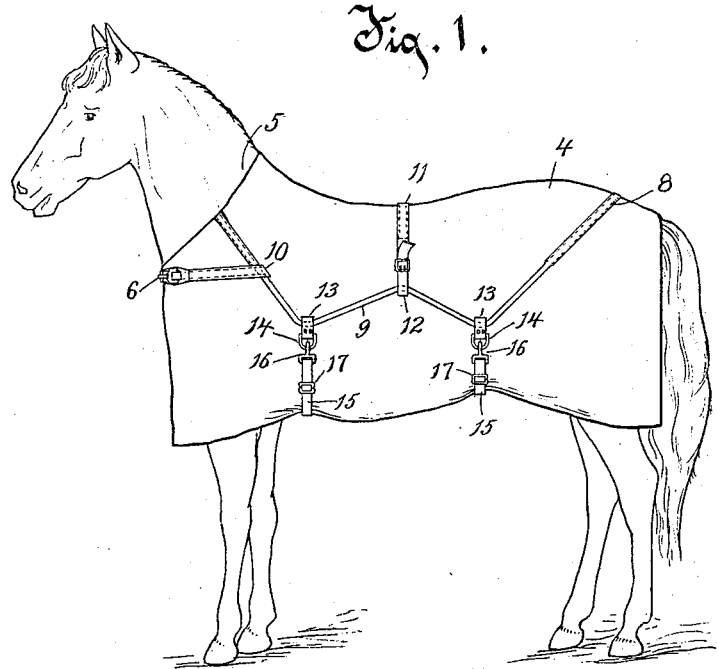
Fig. 1.
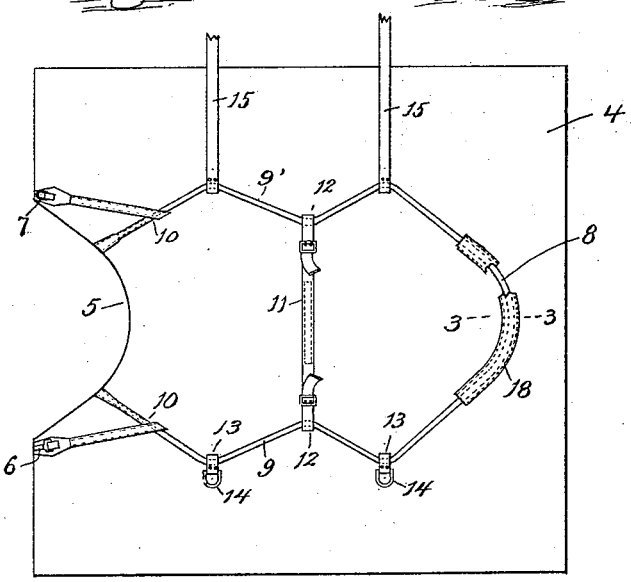
Fig. 2.
Fig. 3.
Witnesses.
Inventor.
James H. Dailey
By Benedict & Morsell
Attorneys.

UNITED STATES PATENT OFFICE.

JAMES H. DAILEY, OF MILWAUKEE, WISCONSIN.

BLANKET.

SPECIFICATION forming part of Letters Patent No. 691,534, dated January 21, 1902.

Application filed August 9, 1901. Serial No. 71,436. (No model.)

*To all whom it may concern:*

Be it known that I, JAMES H. DAILEY, residing at Milwaukee, in the county of Milwaukee and State of Wisconsin, have invented a new and useful Improvement in Blankets, of which the following is a description, reference being had to the accompanying drawings, which are a part of this specification.

My invention has relation to improvements in blankets, more especially intended for horses, although adaptable for other animals.

The primary object had in view is to provide an improved form of blanket of such construction as to be capable of closely fitting animals of different sizes and at the same time when adjusted automatically regulating and adjusting itself so as to fit closely to the animal, not only when said animal is motionless, but also during all different movements and positions of the animal.

With the above primary object in view the invention consists of the devices and parts or their equivalents, as hereinafter more fully set forth.

In the accompanying drawings, Figure 1 is a side elevation of the improved blanket properly adjusted to an animal. Fig. 2 is a plan view of the blanket removed from the animal, but showing a slight modification; and Fig. 3 is a cross-section on the line 3 3 of Fig. 2.

Referring to the drawings, the numeral 4 indicates the body portion of the blanket, which is preferably shaped or formed to the contour of the animal and may have its front edge recessed, as indicated by the numeral 5, in order to fit around the neck of the animal, said front edge being also provided with a snap-hook 6, adapted to engage an eye 7, in order to hold the blanket to the neck of the animal, as is common in this class of devices.

My invention contemplates the employment in connection with the blanket of a cord or equivalent, which at the rear portion of the blanket is extended partly across a medial portion of said rear of the blanket, as indicated by the numeral 8, so that when the blanket is adjusted to the animal, as shown in Fig. 1, the part 8 of the cord will extend downwardly on opposite sides of the animal in a forwardly-slanting direction. In the Fig. 1 form of construction the rear portion 8 is secured by stitches or other desirable means to the blanket, so as to be fixed, and from the opposite ends of the fixed portions the cord is unsecured, thereby forming two loose side members 9 9', said side members extending forwardly to the forward portion of the blanket, where they are secured at the points 10 10.

Secured transversely of the blanket and approximately across a portion of the center thereof is a back-band 11, which is of such length as to be capable of connecting one side member 9 to the other side member 9' and being provided at opposite ends with loops 12 12, through which said side members are adapted to freely pass. The back-band 11 is preferably made adjustable in length. This adjustability may be secured in any desirable manner; but I prefer to employ the tongues and buckles at opposite ends thereof, as clearly shown.

Slidingly fitted on the side member 9 are loops 13 13, which loops carry eyes 14 14. Slidingly fitted on the side member 9' are girth-bands 15 15. These bands are adapted to be carried beneath the animal, as shown in Fig. 1, and their outer ends have secured thereto snap-hooks 16 16, which are adapted to engage the eyes 14. The girth-band may also, if desired, be made adjustable in length by means of suitable adjusting devices 17 17.

In the modified form of construction shown in Figs. 2 and 3 the rear portion 8 of the cord instead of being secured to the blanket against movement is slidingly held in relation thereto by passing freely through a loop 18. In this modified form, therefore, the only points at which the cord 8 is secured immovably to the blanket are at 10 10, while elsewhere throughout the length of the cord said cord is capable of a sliding movement.

By reference to Fig. 1 of the drawings it will be seen that when the blanket is properly adjusted to the animal and the back-band and girth-bands fastened each loose side member of the cord is pulled downwardly at two points by the girth-bands and upwardly at central points by the back-band. This practically forms each side member into a double-V form, and the rear V is so located that the hip-bone of the animal is confined therein. This is advantageous, inasmuch as thereby the blanket is to a great extent prevented from slipping forward or sidewise.

From the construction described, in which the girth-bands and back-band are slidingly fitted to the loose side members 9 9', it will be evident that I provide a blanket capable of automatically adjusting itself properly to any size of animal, the girth-bands of course readily sliding along to adapt themselves to animals of different lengths, and I furthermore provide a construction of blanket which when fitted to the animal will adjust itself so as to lie closely to the animal during all the different movements of said animal. Still further, by my improved construction the strain is equalized throughout the entire blanket, and even on a rising or shifting movement of the animal the strain is reduced and equalized to such an extent that all danger of breaking the girth-bands is avoided.

While the blanket is particularly adapted for horses, yet it will be evident that it may be employed as a covering for cows and other animals.

While I have shown and described certain details of construction, yet I do not wish to be understood as specifically restricting myself thereto. For instance, the loops 12 12 could be entirely omitted without departing from the spirit and scope of my invention. Again, while it is preferable that the cord should continue around the rear of the blanket to form the rear portion 8, yet this is not absolutely essential, as the loose side members 9 9' could be separate and extend a desirable distance rearwardly and be secured at the rear of the covering. Again, while it is preferable that the top or back band 11 should be provided, yet this also is not absolutely essential, as merely the two loops 12 12 could be employed and successful results obtained.

What I claim as my invention is—

1. A blanket for horses, and other animals, consisting of a main covering portion, side cord members extending lengthwise of the covering and at desired distances apart, and loose throughout the greater portion of their lengths, and girth-bands slidingly fitted to one side member, and adapted to slidingly engage the other side member.

2. A blanket for horses, and other animals, consisting of a main covering portion, side cord members extending lengthwise of the covering and at desired distances apart, and loose throughout the greater portion of their lengths, loops through which said side members of the cord freely pass, and girth-bands slidingly fitted to one side member of the cord, and adapted to slidingly engage the other side member of said cord.

3. A blanket for horses, and other animals, consisting of a main covering portion, side cord members extending lengthwise of the covering, and at desired distances apart, and loose throughout the greater portion of their lengths, a top strap passing across a medial portion of the covering and provided at opposite ends with loops through which the side members of the cord freely pass, and girth-bands slidingly fitted to one side member, and adapted to slidingly engage the other side member.

4. A blanket for horses, and other animals, consisting of a main covering portion, side cord members extending lengthwise of the covering and at desired distances apart, and loose throughout the greater portion of their lengths, an adjustable top strap passing across a medial portion of the covering, and provided at opposite ends with loops through which the side members of the cord freely pass, and girth-bands slidingly fitted to one side member, and adapted to slidingly engage the other side member.

5. A blanket for horses, and other animals, consisting of a main covering portion, side cord members extending lengthwise of the covering and at desired distances apart, and loose throughout the greater portion of their lengths, and adjustable girth-bands slidingly fitted to one side member, and adapted to slidingly engage the other side member.

6. A blanket for horses, and other animals, consisting of a main covering portion, a cord extending partly across the rear portion of the covering, and thence forwardly in two loose side members, the ends of said side members being secured to the covering at the forward portion thereof, and girth-bands slidingly fitted to one side member, and adapted to slidingly engage the other side member.

7. A blanket for horses, and other animals, consisting of a main covering portion, a cord extending slidingly partly across the rear portion thereof, and thence forwardly in two loose side members, the ends of said loose side members being secured to the covering at the forward portion of said covering, and girth-bands slidingly fitted to one side member and adapted to slidingly engage the other side member.

In testimony whereof I affix my signature in presence of two witnesses.

JAMES H. DAILEY.

Witnesses:
C. T. BENEDICT,
ANNA V. FAUST.